Jan. 31, 1961 W. E. LARGE 2,970,272

ELECTRONIC CONTROL APPARATUS WITH MAGNETIC INPUT AND OUTPUT LOGIC ELEMENTS

Filed Jan. 11, 1957

2,970,272

ELECTRONIC CONTROL APPARATUS WITH MAGNETIC INPUT AND OUTPUT LOGIC ELEMENTS

William E. Large, Clarence, N.Y., assignor to Westinghouse Electric Corporation, East Pittsburgh, Pa., a corporation of Pennsylvania Filed Jan. 11, 1957, Ser. No. 633,620

7 Claims. (Cl. 328—74)

This invention relates to control apparatus and has particular relation to such apparatus including electronic timing elements and decision or logic elements of the magnetic type.

The apparatus with which this invention in its specific aspect concerns itself includes an electronic timing component to which input and output decision elements are connected. The timing component is actuated to time out by the input decision element and transmits a signal to the output element when it has timed out. Apparatus of this type constructed in accordance with the teachings of the prior art has been found not to operate satisfactorily. Specifically, sporadic timing out in the absence of a signal from the input element has been encountered. In addition, the signals delivered by the output element have not been positive.

It is accordingly broadly an object of this invention to provide reliably and positively operating control apparatus of the above described type.

It is a more specific object of this invention to provide control apparatus including an electronic timing component and magnetic input and output decision elements which shall start a timing out operation only on receiving a positive signal from the input element and shall on timing out cause the output element to produce positive output signals of the maximum available magnitude:

An incidental object of this invention is to provide a novel combination of an input decision element and a discharge device particularly suitable for use in the above described apparatus.

Another incidental object of this invention is to provide a novel combination of a discharge device and an output decision element particularly suitable for use in the above described combination.

This invention in one of its specific aspects arises from the discovery that the sporadic operation of the apparatus in the absence of positive input signals from the input element is caused by the presence between the output terminals of the input element of potential simulating a signal even in the quiescent state of the input element. The output potential of the input element does not swing from zero to its output magnitude when this element is actuated, but from a potential which is produced between these terminals in the unactuated state of the element to its output potential. For example, the output potential may be of the order of 15 volts and the potential in the unactuated state of the element may be as high as 9 volts. Since the supply potential impressed on the input element may vary by as much as plus or minus 10%, the output potential in the actuated state of the element may be as high as 16½ volts or as low as 13½ volts and the unactuated voltage may be as high as 9.9 volts or as low as 8.1. In the example given then, it is necessary that the component which is actuated by the signal distinguish between a signal of 15 volts plus or minus 10% and about 10 volts plus or minus 10%.

In accordance with this invention the timing out of the electronic timing component is triggered by the rendering nonconducting of the discharge device which includes in its control circuit the output terminals of the input element and an alternating potential in phase with the anode-cathode potential of sufficient magnitude to assure that the discharge device is maintained conducting so long as the potential delivered by the input element is substantially lower than the lowest magnitude of the potential output of the input element when actuated.

Another feature of a decision element which requires consideration when it is connected to control a discharge device is that the hot output terminal of the input element is electrically positive. Since the discharge device controlled by this element is to be rendered non-conducting by application of the output potential of the element to the control electrode with the cathode grounded, it is necessary that the positive potential of the element be so connected as to have a blocking effect. In accordance with this invention, a capacitive biasing network for the control circuit of the triggering discharge device has been devised which converts the positive potential produced when the input element is actuated into a negative blocking potential.

This invention in another of its aspects arises from the discovery that on the timing out of the electronic timing component the output element must be supplied with potential during a succession of full half periods to produce its maximum effect. In accordance with this invention, the timing component includes a second or output discharge device which becomes conducting when the component times out and when it does become conducting it supplies full half cycle pulses during each alternate half period following the first. The timing is effected by a time-constant network connected between the control electrode and the cathode of the output discharge device which begins to time out when the triggering discharge device is rendered nonconducting. It has been discovered that if this network is connected to the control electrode through the usual grid resistor, a residual charge remains on the capacitor of this network after the discharge device has been rendered conducting during the first half period and residual charge delays the firing of the discharge device during subsequent alternate half periods. In accordance with this invention, then, the capacitor of the network is connected directly to the control electrode and the cathode of the output discharge device through low resistance connections.

The novel features considered characteristic of this invention are discussed generally above. The invention itself both as to its organization and its method of operation, together with additional objects and advantages thereof, will be understood from the following description of a specific embodiment when read in connection with the accompanying drawing, in which.

*Description*

Figure 1:
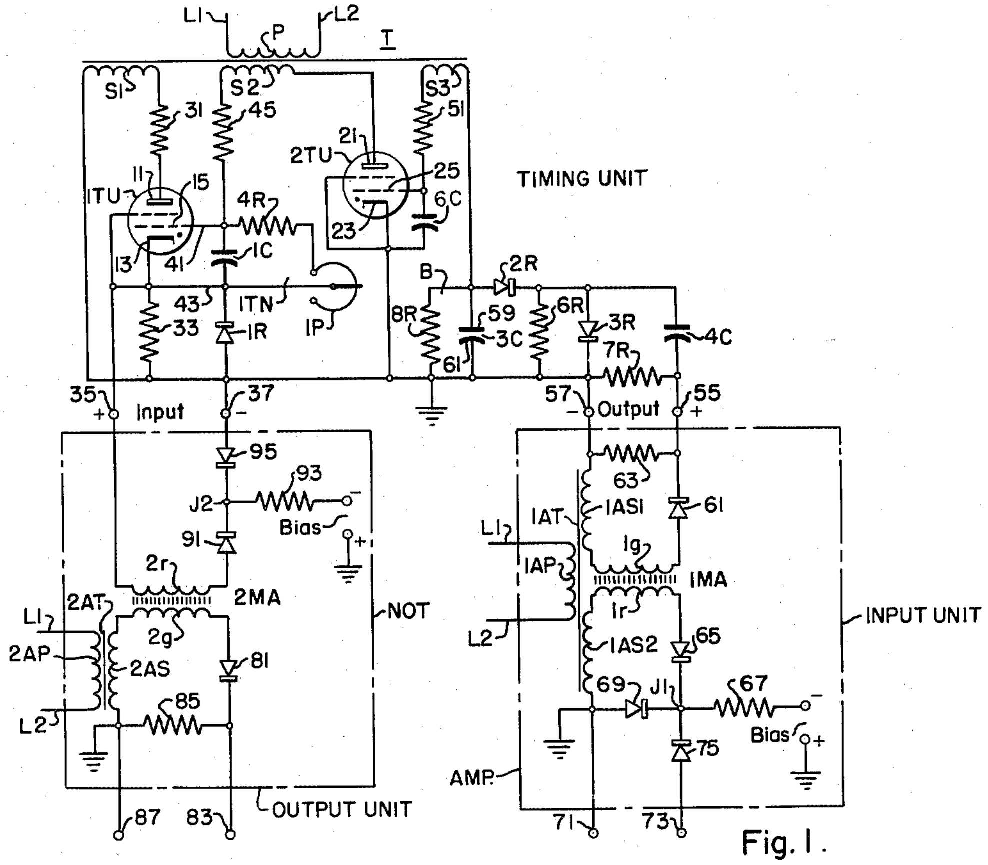
Figure 1 is a circuit diagram showing a preferred embodiment of this invention.

The apparatus shown in Fig. 1 includes a Timing Unit, an Input Unit and an Output Unit. This apparatus is supplied from conductors L1 and L2 which may be energized from the usual supply buses of an alternating current supply of commercial frequency.

The Timing Unit is supplied with potential from the conductors L1 and L2 through a transformer T, the primary P of which is connected to the supply conductors L1 and L2. The transformer T has three secondaries S1, S2 and S3. The Timing Unit includes a signalling thyratron 1TU and a triggering thyratron 2TU. Each of the thyratrons 1TU and 2TU includes an anode 11 and 21, a cathode 13 and 23 and a control electrode 15 and 25, respectively. The Timing Unit also includes a time constant network 1TN and a biasing network B.

Anode-cathode potential is supplied to the thyratron 1TU from the secondary S1. One terminal of this secondary S1 is connected to the anode 11 through an anode resistor 31 and the other terminal is grounded. The ground terminal is connected to the cathode 13 through an output resistor 33. When the thyratron 1TU is conducting, a potential drop appears across the output resistor 33 causing its cathode side to be electrically positive with respect to its ground side. The cathode side of the resistor is connected to the positive input terminal 35 of the Output Unit, the negative terminal 37 of the Output Unit being connected to ground. A rectifier 1R is connected across the resistor and is poled to conduct positive current from the ground side of the resistor to its positive side.

The network 1TN includes a capacitor 1C shunted by a fixed resistor 4R and a variable resistor 1P. The network 1TN is connected between the control electrode 15 and the cathode 13 of 1TU, the capacitor 1C being connected directly to the control electrode 15 and the cathode 13, respectively through low resistance connections 41 and 43. The time interval which the Timing Unit is to time out may be set by the variable resistor 1P and is usually of the order of several periods of the supply.

The anode-cathode circuit of the thyratron 2TU is supplied from the secondary S2. One terminal of this secondary is connected to the anode 21. The cathode is grounded and the ground connection is connected to the other terminal of the secondary S2 through a rectifier 1R, the network 1TN and an anode resistor 45. The rectifier 1R shunts out the output resistor 33 of 1TU and thus prevents the current through this resistor from the thyratron 2TU from rendering 1TU conducting. A surge suppressing capacitor 6C is connected between the grid 25 and the cathode.

The network B includes a capacitor 3C and a resistor 8R. The control electrode 25 of thyratron 2TU is connected to the cathode 23 through a grid resistor 51, the secondary S3 and the network B. The capacitor 3C and the resistor 8R of the network B are so related that when the network B is charged to a potential such as to maintain thyratron 2TU nonconducting and the charging is interrupted, the network can discharge sufficiently to permit 2TU to conduct in a time interval of the order of a period of the supply.

The network B is connected to be charged from the output terminals 55 and 57 of the Input Unit. These output terminals are connected across a resistor 7R. Across this resistor a capacitor 4C and a rectifier 3R are connected. The capacitor 4C and the rectifier 3R are so connected that the capacitor 4C may be charged by the potential appearing between the positive and the negative output terminals through the rectifier. The rectifier 3R blocks the discharge of the capacitor through the resistor 7R once the capacitor 4C is charged, but the capacitor 4C may discharge through a resistor 6R across the rectifier and in addition it may discharge through a rectifier 2R into the capacitor 3C of network B. The capacitor 3C is thus charged substantially to the peak magnitude of the potential between the output terminals 55 and 57 with its plate 59 electrically nearer to the control electrode 25 of 2TU negative relative to the other plate 61. The potential output of the secondary S3 is greater than the greatest potential which appears across the output terminals 55 and 57 of the Input Unit when the latter is unactuated, but is substantially less than the potential which appears across the output terminals when the Input Unit is actuated.

The Input Unit may be a decision element of any type available in the art. The actual Input Unit shown in Fig. 1 is an amplifier (AMP). The Input Unit is supplied with potential from a transformer 1AT having a primary 1AP and secondaries 1AS1 and 1AS2. The primary 1AP is supplied from the conductors L1 and L2.

The Input Unit includes a magnetic amplifier 1MA having a gating widing 1*g* and a reset winding 1*r*. The gating winding 1*g* is supplied from the secondary 1AS1 through a rectifier 61. One terminal of the secondary 1AS1 is connected to the negative output terminal 57 of the Unit and the rectifier 61 is connected to the positive terminal 55 so as to conduct positive current (holes or positive ions) from the winding 1*g* to the terminal 55. Thus, when the Input Unit is actuated to a potential is impressed between the positive and the negative output terminals making the positive output terminal electrically positive relative to the negative. A resistor 53 is connected between the positive and the negative terminals 55 and 57.

The reset winding 1*r* is supplied from the secondary 1AS2 through a rectifier 65. One terminal of the secondary 1AS2 is grounded and the rectifier 65 is connected to ground through a resistor 67 and a bias which tends to maintain the junction J1 of the resistor 67 and the rectifier 65 electrically negative. A rectifier 69 is connected between ground and the junction J1. The Input Unit has input signal terminals 71 and 73, one of which 71 is grounded and the other, 73, of which is connected to the junction J1 through a rectifier 75 so that a positive signal may be impressed on this junction J1.

The rectifier 65 is poled to conduct positive current from the winding 1*r* to ground and the secondary 1AS2 thus causes current to flow through the reset winding 1*r* in the absence of a signal on junction J1. When a positive signal is impressed on junction J1 which exceeds the bias sufficiently, the flow of current through the reset winding 1*r* is blocked.

The Output Unit may be of any type available but is shown as a NOT. This Unit is supplied from a transformer 2AT, the primary 2AP of which is energized from conductors L1 and L2.

The Output Unit includes a magnetic amplifier 2MA having a gating winding 2*g*, and a reset winding 2*r*. The gating winding is supplied from the secondary 2AS through a rectifier 81. One terminal of the secondary 2AS is grounded and the other terminal is connected to the output terminal 83 of the Unit through the rectifier 81 and the winding 2*g*. The rectifier 81 is poled to conduct positive from the winding 2*g* to the terminal 83. A resistor 85 is connected between the ground side of the secondary 2AS which is also the ground terminal 87 of the Unit and the rectifier and the output terminal 83.

The positive input terminal 35 of the Unit is connected to one terminal of the reset winding 2*r*. The other terminal of the reset winding is connected to ground through a rectifier 91, a resistor 93 and a bias. The junction J2 of the rectifier 91 and the resistor 93 is connected to the negative input terminal 37 through another rectifier 95 poled to conduct positive current from the negative input terminal to the junction J2.

*Standby*

Figure 2:
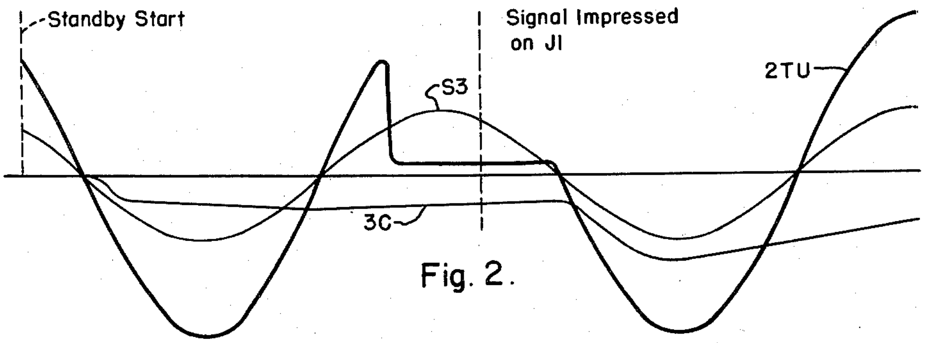
Fig. 2 is a graph illustrating the operation of Fig. 1.

The standby condition and the operation of the apparatus will be explained with reference to Figs. 2 and 3. In Fig. 2, voltage is plotted vertically and time horizontally. The heavy line curve represents the anode-cathode potential on thyratron 2TU, the lighter line sine curve the potential supplied by secondary S3 and the other lighter line curve the potential on capacitor 3C.

Figure 3:
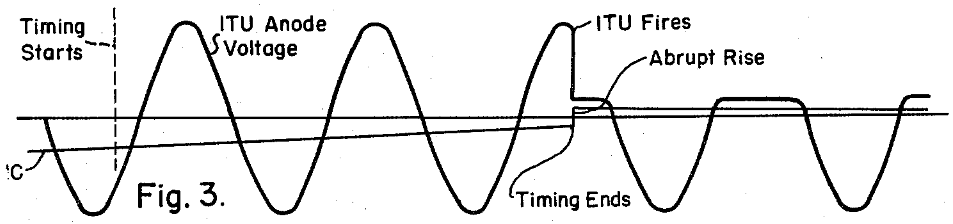
Fig. 3 is another graph illustrating the operation of Fig. 1.

In Fig. 3 voltage is plotted vertically and time horizontally. The heavy curve represents the anode-cathode potential on 1TU; the lighter line curve the potential on capacitor 1C, that is, on timing network 1TN.

In the standby condition of the apparatus the conductors L1 and L2, transformers T, 1AT and 2AT are energized and the heaters or the cathodes of 13 and 23 of 1TU and 2TU are energized. But there is no signal at the input signalling terminals 71 and 73 of the Input Unit and thus no signal at J1. During the first gating half period a half-cycle of current flows through gating winding 1*g* producing saturation of one polarity of the amplifier 1MA. Since there is no signal at J1, a reset pulse flows during the succeeding half period to revert the amplifier 1MA to the first polarity. Since the impedance of 1MA when it is operating in this manner is high, the potential across the output terminals is then relatively low and the capacitor 4C is charged to a low potential. This charge is transferred through the rectifier 2R to capacitor 3C. As can be seen from Fig. 2, the potential on 3C is smaller than the peak potential of the secondary S3 and thyratron 2TU is rendered conducting at least during a part of its positive half period of anode-cathode potential. The conduction of thyratron 2TU charges network 1TN to maintain thyratron 1TU nonconducting. The charge on capacitor 1C is as represented on the extreme left of Fig. 3, and this charge is maintained on 1C so long as 2TU conducts. 2TU conducts during at least a part of every half period so long as the Input Unit remains quiescent and thus maintains 1TU nonconducting.

In the Output Unit the secondary 2AS causes half cycles of current to flow through the gating winding 2*g* during alternate half periods. The first of these pulses causes the amplifier 2MA to become saturated. Since thyratron 1TU is nonconducting, corresponding pulses are not supplied through the reset winding 2*r*. The impedance of 2MA is then small and a potential appears between the output signal terminals 83 and 87 of the Output Unit.

*Operation*

In the operation of the apparatus a signal is impressed on the junction J1 blocking the flow of reset pulses through the winding 1*r*. The impedance of the amplifier 1MA following the first gating pulse after the signal is impressed at J1 is then low and a substantial output potential appears between the output terminals 55 and 57. The capacitor 3C is now charged to a potential substantially higher than that impressed from the secondary S3 (see right-hand portion Fig. 2) and thyratron 2TU is rendered nonconducting. Capacitor 1C now begins to time out as represented by the discharging curve 1C of this capacitor in Fig. 3. The timing out continues until the capacitor potential is lower than the critical grid potential of thyratron 1TU, and the timing interval is measured by this time of discharge. Once the potential of capacitor 1C is lower than the critical control potential of 1TU, 1TU is rendered conducting. The conduction may be initiated at any instant in a positive half period of anode-cathode potential of 1TU. As soon as it is initiated, the potential of capacitor 1C rises to that of the plasma of the discharge as represented by the abrupt rise in its potential curve in Fig. 3. After 1TU is rendered conducting, then, the potential of capacitor 1C positively exceeds the critical control potential and thereafter thyratron 1TU is rendered conducting at the beginning of each succeeding half period of positive anode-cathode potential.

The conduction of thyratron 1TU after the first conducting half period causes full half cycles of current to flow through the output resistor 33 and full half cycle resetting pulses are transmitted through the reset winding 2*r*. The amplifier 2MA is then reset following each gating half period and its impedance becomes high so that potential between its output signal terminals 83 and 87 is substantially absent. This signals the end of the timing interval.

While a specific embodiment of this invention has been disclosed herein, many modifications thereof are feasible. The invention therefore is not to be restricted except insofar as is necessitated by the prior art and by the spirit of the appended claims.

I claim as my invention:

1. In combination a first decision element of the magnetic type having a positive output terminal and a negative output terminal and having a first predetermined output voltage between said terminals in its actuated condition and a second predetermined voltage between said terminals of substantially lower magnitude than said first voltage in its unactuated condition, a second decision element of the magnetic type having a positive input terminal and a negative input terminal, a first electric discharge device having an anode, a cathode and a control electrode, a first time-constant network, means connecting said anode and cathode in series with said network, means connected to said anode and cathode and to said network for impressing a first alternating potential between said anode and cathode, a biasing network, means for deriving a second alternating potential having an amplitude substantially lower than the amplitude of said first voltage and higher than the amplitude of said second voltage, means connecting said biasing network, said deriving means, said control electrode and said cathode in series so that said second potential is impressed between said control electrode and said cathode in phase with said first potential, means connecting said positive and negative output terminals to said biasing network so that said network is charged by the voltage between said output terminals with its terminal electrically nearer said control electrode negative relative to its terminal electrically nearer said cathode, a second electric discharge device having an anode, a cathode and a control electrode, means connected to said anode and cathode of said second device for impressing a third alternating potential between said last-named anode and cathode, means connecting said positive and negative input terminals to said anode and cathode of said second device so that when said second device is conducting a potential is impressed between said positive and negative input terminals making said positive input terminal electrically positive relative to said negative input terminal, and means connecting said first network between said control electrode and cathode of said second device, said last-named connecting means including a low resistance connection between said network and said control electrode.

2. In combination a decision element of the magnetic type having a positive output terminal and a negative output terminal, and having a first predetermined voltage between said terminals in its actuated condition and a second predetermined voltage between said terminals of appreciable but substantially lower magnitude than said first voltage in its unactuated condition, an electric discharge device having an anode, a cathode and a control electrode, means connected to said anode and cathode for impressing a first alternating potential therebetween, a network including a capacitor, means for producing a second alternating potential having an amplitude greater than the peak magnitude of said second voltage but substantially less than the peak magnitude of said first voltage, means connecting said producing means, said control electrode, said cathode and said network in series to impress said second potential between said control electrode and cathode substantially in phase with the potential impressed between said anode and cathode, and means connecting said terminals to said capacitor to charge said capacitor from the voltage across said terminals with its plate electrically nearer said control electrode negative relative to the plate electrically nearer said cathode.

3. In combination a decision element of the magnetic type having a positive output terminal and a negative output terminal, and having a first predetermined voltage between said terminals in its actuated condition and a second predetermined voltage between said terminals of appreciable but substantially lower magnitude than said first voltage in its unactuated condition, an electric discharge device having an anode, a cathode and a control electrode, means connected to said anode and cathode for impressing a first alternating potential therebetween, a network including a capacitor, means for producing a second alternating potential having an amplitude greater than the peak magnitude of said second voltage but substantially less than the peak magnitude of said first voltage, means connecting said producing means, said control electrode, said cathode and said network in series to impress said second potential between said control electrode and cathode substantially in phase with the potential impressed between said anode and cathode, and means connecting said terminals to said capacitor to charge said capacitor from the voltage across said terminals with its plate electrically nearer said control electrode negative relative to the plate electrically nearer said cathode, said last-named connecting means including a second capacitor, a first rectifier, means connecting in series said positive terminal, said negative terminal, said second capacitor and said rectifier with said rectifier poled to conduct positive current from said positive terminal to said negative terminal through said second capacitor, a second rectifier, and means connecting in series, said first-named capacitor, said rectifier and said second capacitor, with said second rectifier poled to conduct positive current from said second capacitor to charge said first-named capacitor.

4. In combination a first electric discharge device having an anode, a cathode and a control electrode, a second discharge device having an anode and a cathode, an output resistor, means connecting one terminal of said resistor to said cathode of said first device, first alternating current potential supply means connected between the other terminal of said resistor and said anode of said first device, a time-constant network, second alternating current potential supply means, means connecting in series said second supply means, said anode and cathode of said second device and said network, and means connecting said network between said control electrode and cathode of said first device, said series connecting means including rectifier means bypassing said resistor.

5. In combination a decision element of the magnetic type having positive and negative input terminals, said element being of the type which requires that substantially full half-cycle pulses be transmitted between its positive and negative input terminals for the effective control thereof, an electric discharge device having an anode, a cathode and a control electrode, a time-constant network having a capacitor, means connected to said anode and cathode for impressing an alternating potential between said anode and cathode, means connecting said network betwen said control electrode and cathode with said capacitor connected to said control electrode and cathode respectively by low resistance connections, and means connecting said terminals to said anode and cathode so that when said device is conducting substantially full half-cycle pulses are transmitted between said positive and negative terminals and said positive terminal is electrically positive and said negative terminal is electrically negative.

6. In combination a decision element of the magnetic type having positive and negative input terminals, said element being of the type which requires that substantially full half-cycle pulses be transmitted between its positive and negative input terminals for the effective control thereof, an electric discharge device having an anode, a cathode and a control electrode, a time-constant network having a capacitor, means connected to said anode and cathode for impressing an alternating potential between said anode and cathode, said connecting means including a resistor, and there being a positive to negative potential drop across said resistor when said device is conducting, means connecting said network between said control electrode and cathode with said capacitor connected to said control electrode and cathode respectively by low resistance connections, means connecting said positive terminal to an electrically more positive point of potential drop on said resistor, and means connecting said negative terminal to an electrically less positive point of potential drop on said resistor, whereby when said device is conducting substantially full half-cycle pulses are transmitted between said positive and negative terminals.

7. In combination a decision element of the magnetic type having positive and negative input terminals, said element being of the type which requires that substantially full half-cycle pulses be transmitted between its positive and negative input terminals for the effective control thereof, an electric discharge device having an anode, a cathode and a control electrode, a time-constant network having a capacitor, means connected to said anode and cathode for impressing an alternating potential between said anode and cathode, said connecting means including a resistor, and there being a positive to negative potential drop across said resistor when said device is conducting, a rectifier connected across said resistor poled to conduct a positive current from the electrically more negative point of potential drop to the electrically less negative point of potential drop, means connecting said network between said control electrode and cathode with said capacitor connected to said control electrode and cathode respectively by low resistance connections, means connecting said positive point of potential drop on said resistor to said positive input terminal, and means connecting said negative terminal to an electrically more-negative point of potential drop on said resistor than the point to which said positive terminal is connected, whereby when said device is conducting substantially full half-cycle pulses are transmitted between said positive and negative terminals.

References Cited in the file of this patent

UNITED STATES PATENTS

| | | |
|---|---|---|
| 2,174,386 | King | Sept. 26, 1939 |
| 2,508,973 | Smith | May 23, 1950 |
| 2,564,500 | Poole | Aug. 14, 1951 |
| 2,745,052 | Willemse | May 8, 1956 |
| 2,767,351 | Gieseke | Oct. 16, 1956 |
| 2,780,668 | Farr et al. | Feb. 6, 1957 |
| 2,780,750 | Parsons | Feb. 5, 1957 |
| 2,785,346 | Large | Mar. 12, 1957 |
| 2,809,297 | Hartwig et al. | Oct. 8, 1957 |
| 2,875,335 | Rainis et al. | Feb. 24, 1959 |